April 11, 1967     L. H. ÖHMAN     3,313,499

FLARE FOR HIGH SPEED VEHICLES

Filed May 10, 1965

INVENTOR

LARS H. ÖHMAN

By

PATENT AGENT

United States Patent Office 3,313,499
Patented Apr. 11, 1967

3,313,499
FLARE FOR HIGH SPEED VEHICLES
Lars H. Öhman, Ottawa, Ontario, Canada, assignor to Canadian Patents and Development Limited, Ottawa, Ontario, Canada, a Canadian company
Filed May 10, 1965, Ser. No. 454,280
3 Claims. (Cl. 244—3.3)

This invention relates to an improved flare for high speed rocket or ballistic vehicles and more particularly to a modified form of the conical flare type of tail surface of a rocket device which provides improved lifting or restoring force efficiency.

The stability of a rocket type vehicle travelling at high speeds in a fluid is maintained through a delicate balance of forces around the center of gravity of the vehicle. As is well known, stability is improved by moving the center of gravity as far forward as possible and by providing tail surfaces that increase the lift or restoring force at the rear. The rear lifting surfaces usually employed are fins or circular conical flares (truncated circular cones) or a combination of flares and fins. At high speeds, the circular conical flare is preferred to fins because of its better lifting capacity and structural integrity.

Because of physical limitations, it is often difficult to move the center of gravity forward in a rocket and, therefore, it is highly desirable that the rear lifting surfaces be as efficient as possible. The circular conical flare imposes certain limitations in the design of the rocket vehicle which affects the overall performance. The limited lifting capacity of the circular conical flare has been found to be due to the fact that the more lift-efficient two-dimensional flow at the beginning of the flare gradually changes over to the less lift-efficient three-dimensional flow over the rear portions of the circular flare where also the largest lifting surface is located.

It is an object of the present invention to provide an improved flare for high speed rocket type vehicles that provides more lifting capacity with no appreciable increase in drag.

This and other objects of the invention are achieved by providing a flare of the circular conical type that gradually changes in cross-section from circular to the form of a geometrical figure of generally straight sides. The preferred geometrical form would be a square.

In drawings which illustrate embodiments of the invention,

Figures 1, 4:
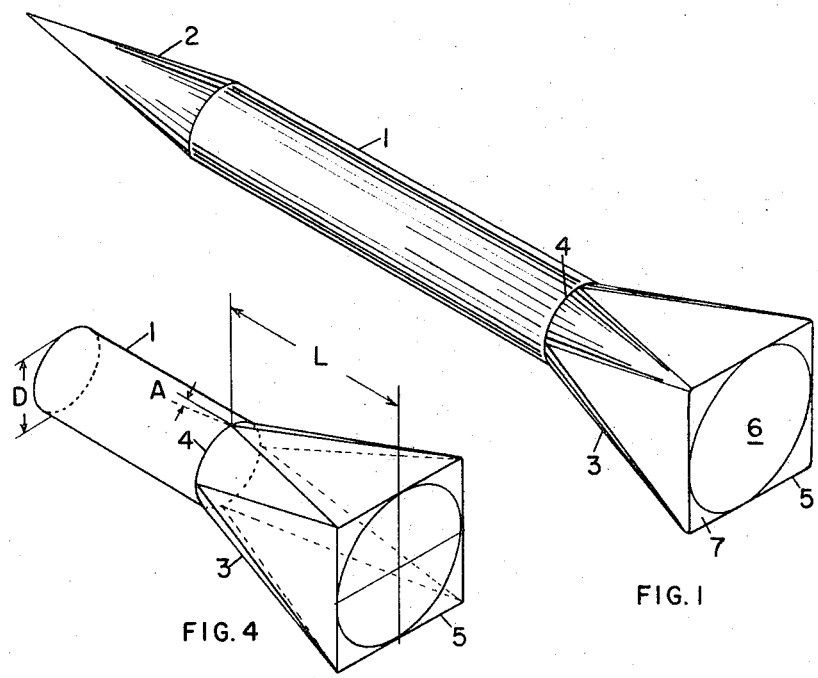
FIGURE 1 is a three-quarter view of a rocket with a square flare.
FIGURE 4 is a geometrical diagram showing the generation of the square cross-section from the circular cross-section.

Referring to FIGURE 1, a rocket type vehicle having a cylindrical body 1 and a conical nose cone 2 is illustrated. The tail assembly of this rocket is made up of a flare shown generally as 3 that gradually changes in cross-section from circular at the point of attachment 4 to the main body of the rocket to a square at the trailing edge 5. Flares 3 may be attached to tail-pipe 6. In many applications, the space 7 between the flare and the tail-pipe would be filled with structural material such as foamed plastic, honeycomb structures, etc. These rockets are normally expendable and the structural members are only required to provide structural strength for relatively short durations.

Figures 2, 3:
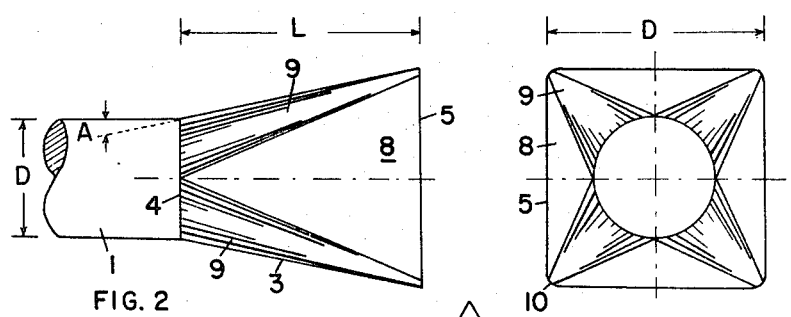
FIGURE 2 is a side view of the square flare of FIGURE 1.
FIGURE 3 is a front-end view of the rocket of FIGURE 1.

FIGURE 2 is a side-view of the square flare of FIGURE 1. The flare has a length L and flare angle A. It will be seen that the curved surfaces 9 each are portions of a conical surface. FIGURE 3 is a front-end view of the rocket with square flare. For structural reasons, it is preferable not to have a completely defined square generated but to have corners 10 rounded at the trailing edge. FIGURE 4 shows the geometry of the square flare generated from a circle. It will be noticed that there are no doubly curved surfaces which leads to simplicity of design and construction.

Figures 5, 6:
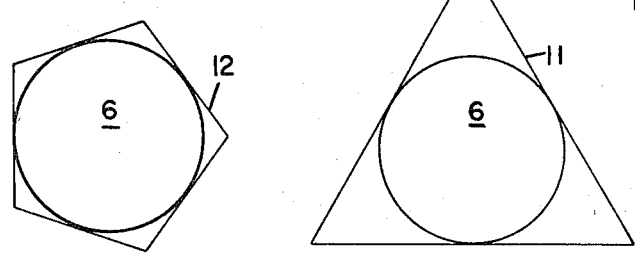
FIGURE 5 is a schematic diagram of a flare that is triangular at the trailing edge.
FIGURE 6 is a schematic diagram of a flare that is five-sided (polygonal) in cross-section at the trailing edge.

It has been found that the square is the most efficient cross-section for the flare. There may be cases where it would be preferable to use a "triangular" or a "pentagonal" flare. These are shown schematically in FIGURES 5 and 6. It will be seen that a triangle 11 or a pentagon 12 may be generated at the trailing edge of the flare. The triangular form would pose certain structural difficulties and induce more drag for a flare of length L attached to a rocket of diameter D than a square flare. A five-sided flare (pentagon) would probably not give sufficient increase in efficiency over a circular flare to warrant the structural problems involved in its fabrication.

The fundamental theory behind the square flare is as follows. Considering first the flow over a conical flare at the flare-cylinder junction the flow is two-dimensional and becomes gradually three-dimensional (conical) as it moves downstream along the conical flare. The two-dimensional lifting pressure due to incidence is, under these circumstances, much higher than the corresponding three dimensional. Thus the lifting pressure per unit area on the flare is highest where the projected area in a body axis plane is smallest. If the two-dimensional character of the flow could be maintained over the entire flare, a much more lift-efficient flare would result. This can be achieved approximately above a certain Mach number by the flare design described above wherein the cross-section changes from circular to square. Above a certain Mach number the flow over the flat portions of the flare resembles that of the windward side of a delta wing aircraft with supersonic leading edges. Approximately, the mean lifting pressure is then equivalent to the corresponding two-dimensional lifting pressure. The flow over the curved portions is more complicated in that the local slope at the rocket cylinder-flare junction is a function of the circumferential orientation varying from being equal to the flare angle (A) at the center line of the flat parts to correspondingly greater at the center line of the curved portions.

It is realized that a penalty in drag is involved in the increased lift due to the larger projected area perpendicular to the stream direction (ratio 4:π) and also the higher mean pressure acting on the square flare. It has been found however that the increase in lift efficiency for the square flare more than compensates for the loss due to increased drag.

Wind-tunnel tests have shown that there is considerable aerodynamic advantage in using the square flare design. These tests also showed that the lifting characteristics are virtually independent of the roll orientation of the flare. Geometrically, the square flare is a simple body in that all generators are straight lines, and therefore it does not present any large structural design and manufacturing problems.

What is claimed is:
1. A flare for high speed rocket-type vehicles travelling in a fluid wherein said flare gradually changes in cross-section from circular at the point of attachment of the body of the rocket-type vehicle to the form of a square having generally straight sides at the trailing edge.

2. A flare for high speed rocket-type vehicles travelling in a fluid wherein said flare gradually changes in cross-section from circular at the point of attachment to the body of the rocket-type vehicle to the form of a triangle having generally straight sides at the trailing edge.

3. A flare for high speed rocket-type vehicles travelling in a fluid wherein said flare gradually changes in cross-section from circular at the point of attachment to the body of the rocket-type vehicle to the form of a pentagon having generally straight sides at the trailing edge.

References Cited by the Examiner
UNITED STATES PATENTS

| | | | |
|---|---|---|---|
| 871,156 | 11/1907 | Aasen | 102—50 |
| 2,081,703 | 3/1963 | Kamp et al. | 102—50 |

BENJAMIN A. BORCHELT, *Primary Examiner.*

V. R. PENDEGRASS, *Assistant Examiner.*